AUTOMATIC TELEPHONE SYSTEM AUXILIARY LINE FINDER ARRANGEMENT

Filed March 1, 1949 3 Sheets-Sheet 1

INVENTOR
O. C. HALL
BY
R. O. Covell
ATTORNEY

Sept. 25, 1951 O. C. HALL 2,568,804

AUTOMATIC TELEPHONE SYSTEM AUXILIARY LINE FINDER ARRANGEMENT

Filed March 1, 1949 3 Sheets-Sheet 2

| AUXILIARY FINDER GROUP NO. | AUXILIARY FINDER NUMBER 1 | 2 | 3 | 4 | 5 | 6 | 7 |
|---|---|---|---|---|---|---|---|
| 1 | G1-11 | G2-11 | G3-11 | G1-21 | G2-21 | G3-21 | G1-31 |
| 2 | G2-31 | G3-31 | G1-41 | G2-41 | G3-41 | G1-51 | G2-51 |
| 3 | G3-51 | G1-61 | G2-61 | G3-61 | G1-71 | G2-71 | G3-71 |
| 4 | G1-81 | G2-81 | G3-81 | G1-91 | G2-91 | G3-91 | G1-01 |

REGULAR 200 POINT LINE FINDER GROUP AND TERMINAL NUMBER

INVENTOR
O. C. HALL
BY R. O. Covell
ATTORNEY

Sept. 25, 1951 O. C. HALL 2,568,804

AUTOMATIC TELEPHONE SYSTEM AUXILIARY LINE FINDER ARRANGEMENT

Filed March 1, 1949 3 Sheets-Sheet 3

INVENTOR
O. C. HALL
BY R. O. Covell
ATTORNEY

Patented Sept. 25, 1951 2,568,804

UNITED STATES PATENT OFFICE 2,568,804

AUTOMATIC TELEPHONE SYSTEM AUXILIARY LINE FINDER ARRANGEMENT

Oliver C. Hall, Fair Lawn, N. J., assignor to Bell Telephone Laboratories, Incorporated, New York, N. Y., a corporation of New York Application March 1, 1949, Serial No. 78,908

8 Claims. (Cl. 179—18)

Figure 1:
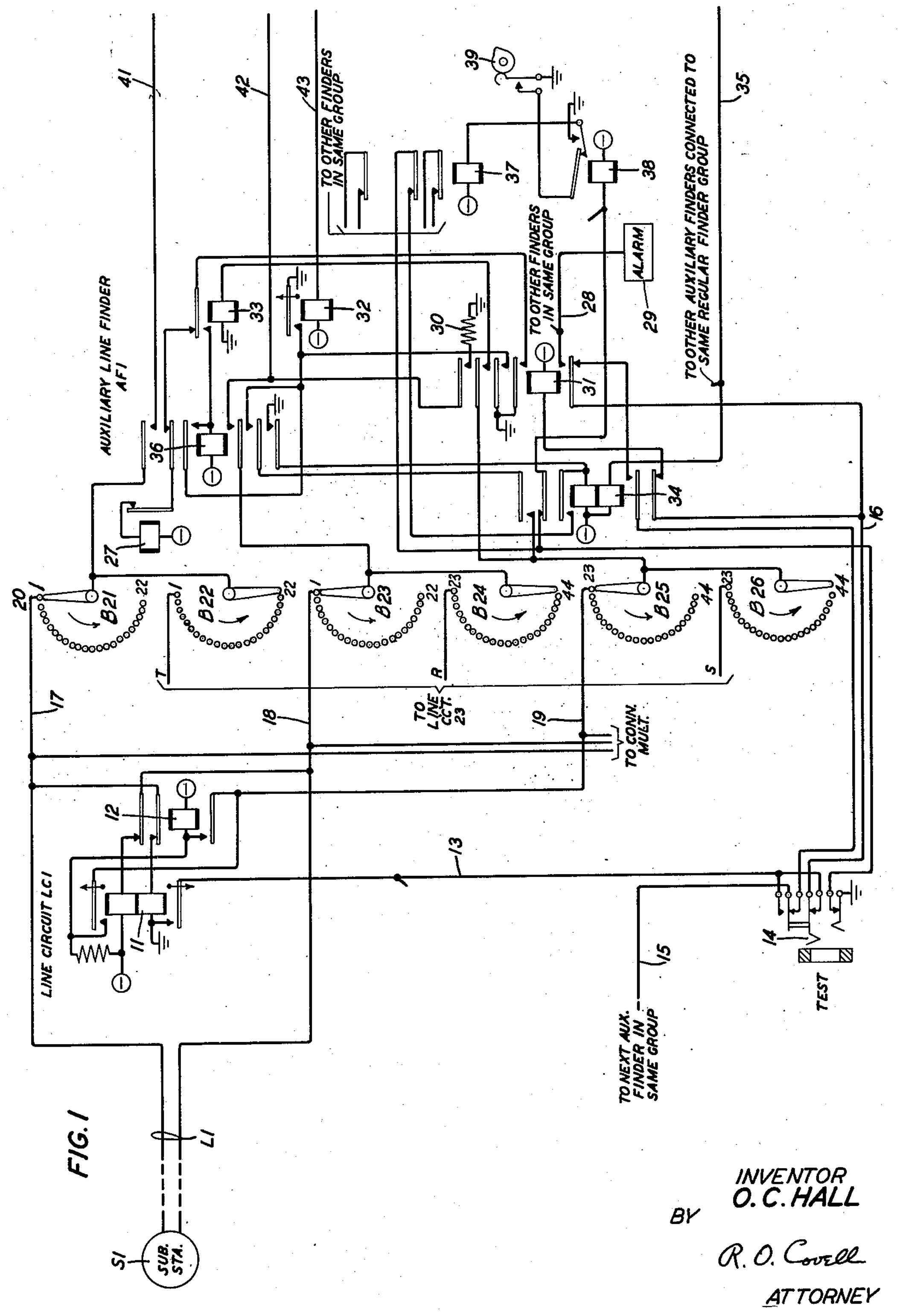

This invention relates to automatic telephone systems and particularly to systems comprising line finder switches for establishing connections with calling subscriber lines.

Objects of the invention are an increased efficiency in the use of numerical selector switches in dial telephone offices and minimization of the equipment required for increasing the number of subscriber lines served by existing groups of selector switches.

This invention is a switching arrangement wherein a plurality of groups of auxiliary line finders are provided for increasing the number of subscriber lines which are common to existing groups of line finder-selector links. According to the invention, a plurality of groups of auxiliary line finder switches are provided, each of the auxiliary line finders being individually connected to the first set of terminals in a subgroup of all of the regular line finders in one of the line finder-selector groups, the first auxiliary finder in a group being accessible to the regular finders of the first regular finder group, the second auxiliary finder of the same group being accessible to the regular finders of the second group of regular finders and so on; so that the calls originating over the subscriber lines accessible to each group of auxiliary line finders will be distributed over all of the regular line finder-selector links.

The invention and its various features as embodied in systems comprising regular line finders and selectors of the well-known two-motion step-by-step type and auxiliary finders of the rotary step-by-step type, is shown schematically in the accompanying drawing which consists of four figures. The invention is, however, not limited in its application to systems comprising switches of the above-mentioned types but is generally applicable to dial telephone systems irrespective of the type of switches employed therein.

Figures 2, 3:
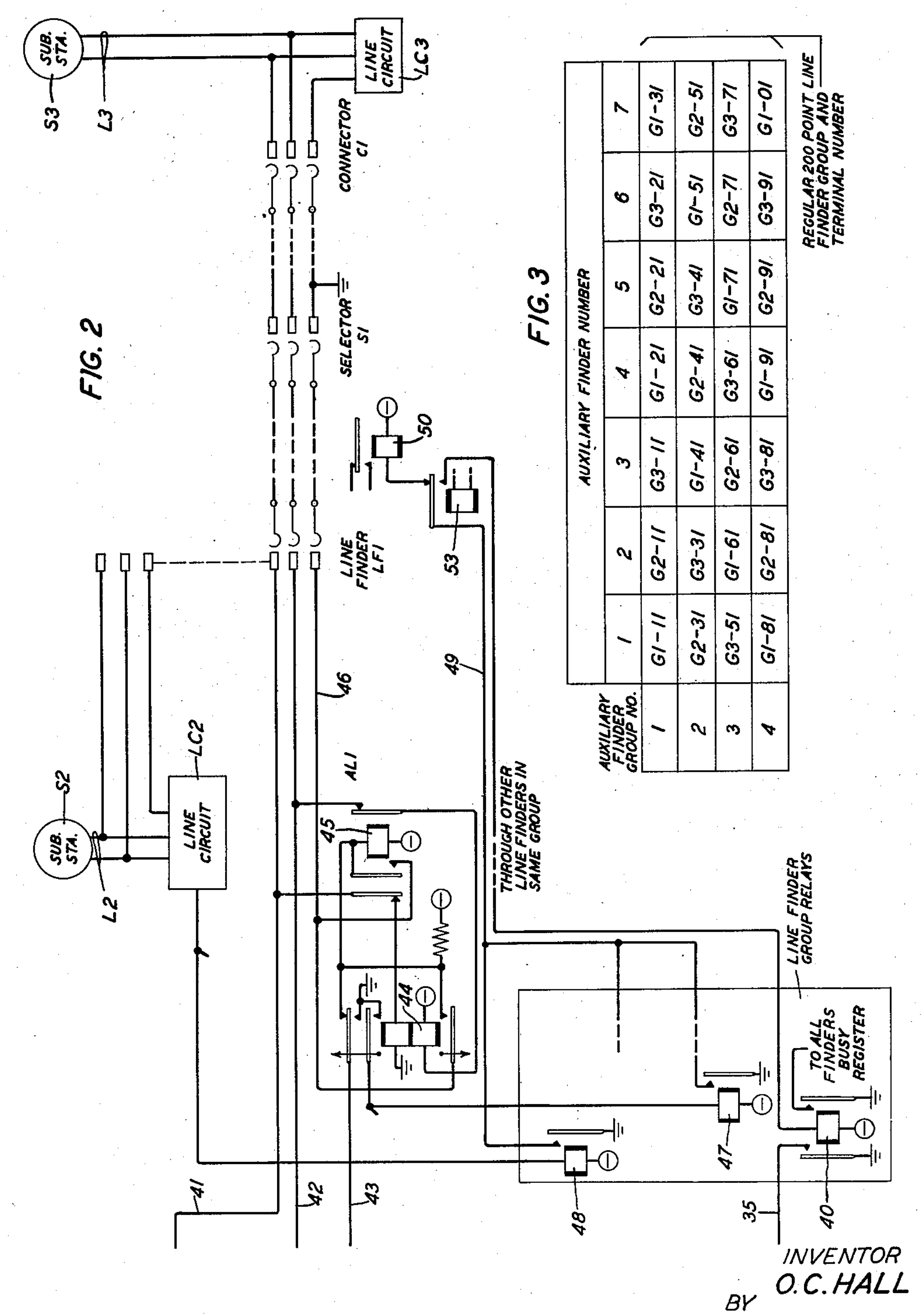
Figure 4:
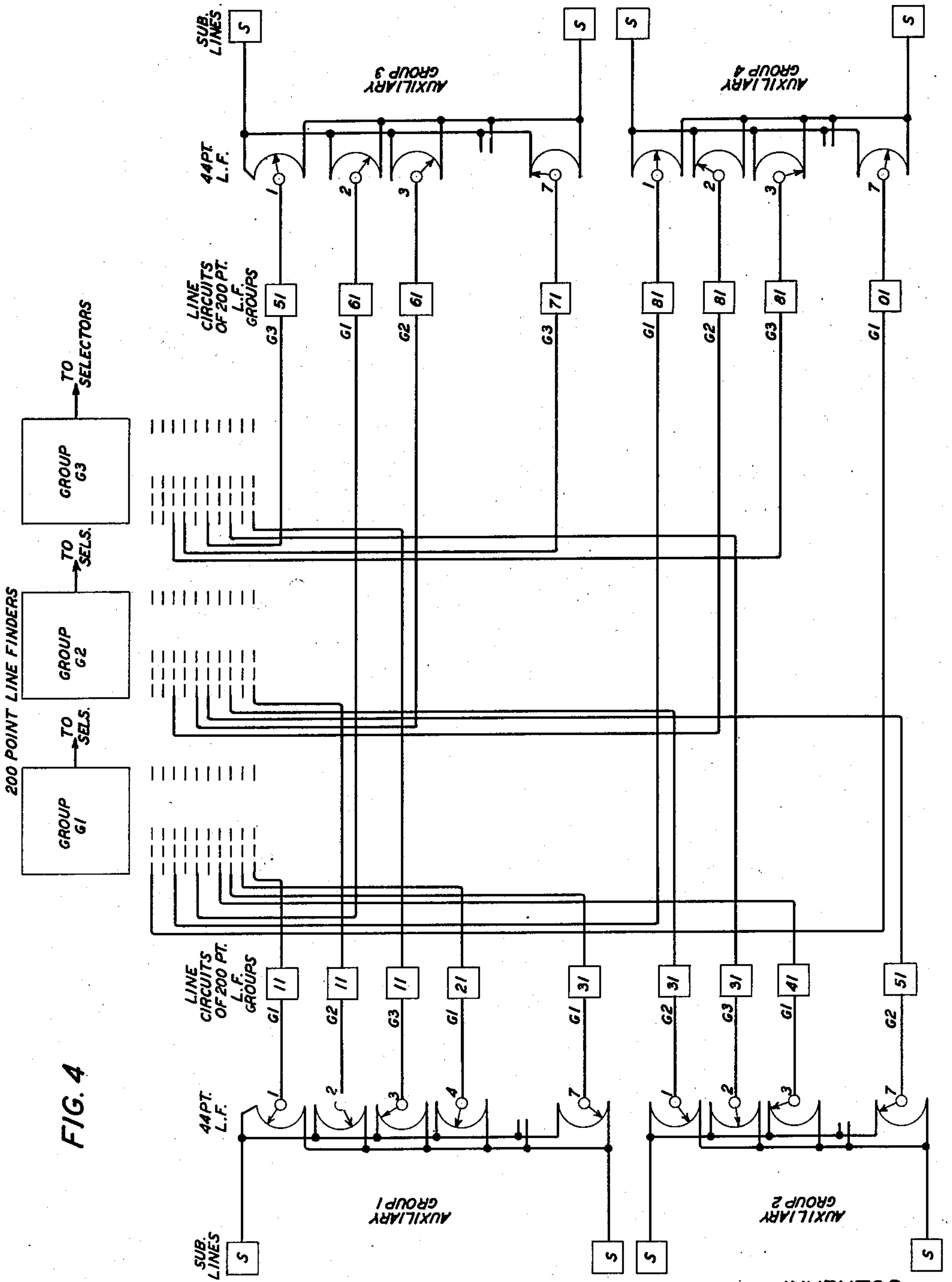

Referring to the drawings:

Figs. 1 and 2 represent a dial telephone system comprising subscriber stations, auxiliary line finder switches of the rotary step-by-step type and regular line finder switches and selector and connector switches of the step-by-step two-motion type; and Figs. 3 and 4 show the method of connecting the auxiliary line finders to terminals on the banks of the regular line finders.

The subscriber stations S1, S2 and S3 may be of the common battery type, each including a dial for controlling selector and connector switches to establish desired connections. The regular line finder, selector and connector switches are of the two-motion step-by-step type. Reference may be had to "Automatic Telephony" by Smith and Campbell, 2nd edition, pages 53 to 67, for a description of the structure of such switches and their operation when used as selectors and connectors. The auxiliary line finders are rotary step-by-step switches having two sets of brushes and terminal banks. In Fig. 1 a subscriber station S1 is connected by line L1 to a line circuit LC1, comprising line relay 11 and cut-off relay 12, and to a set of terminals in the banks of an auxiliary line finder AF1 comprising a 44-point step-by-step rotary switch 20 having a first set of brushes B21, B22 and B23 having access to terminal sets 1 to 22 and a second set of brushes B24, B25 and B26 having access to terminal sets 23 to 44, the two sets of brushes being mounted 180 degrees apart on a common shaft and having no normal position. A stepping magnet 27 controls the advance of the two sets of brushes to establish connection with a calling line. All of the sets of terminals may be connected to subscriber line circuits but preferably one set of terminals is connected to a test line. The tip, ring and sleeve conductors 17, 18 and 19 of line circuit LC1 are also multipled to sets of terminals in each of the other auxiliary line finders of the same group and are also connected to sets of terminals in the banks of connector switches. Each subscriber line in the same auxiliary line finder group has a line circuit which is similarly connected to terminals in the banks of each of the auxiliary line finders in the group and to terminals in the banks of connector switches. Each of the auxiliary line finder switches 20 has individually associated therewith a test jack 14, a start relay 31, a release relay 32, a control relay 33, a busy relay 34 and a cut-through relay 36. Fig. 1 further shows allotter relays 37 and 38 which are common to all of the auxiliary line finders in the same group.

In Fig. 2 a subscriber station S2 is connected by line L2 to line circuit LC2 and to sets of terminals in the banks of a group of regular line finders, one of which is the finder LF1; and although not shown, line circuit LC2 is also connected to sets of terminals in the banks of a group of connector switches. Another subscriber station S3 is shown connected by line L3 to a line circuit LC3 and to a set of terminals in the bank of connector switch C1; and although not shown, line L3 is also connected either to terminals in the banks of a group of auxiliary line finders or to terminals in the banks of a group of regular line finders. The tip, ring and sleeve conductors 41, 42 and 43 of auxiliary finder AF1 are connected to auxiliary line circuit AL1 and to a set of terminals in the bank of the regular line finder LF1 and to terminals in the banks of the other finders in the same group. The conductors 41, 42 and 43 do not connect to terminals in the banks of connector switches and the line circuit AL1 is a modification of the regular line circuits, such as LC2. Reference may be had to the R. L. Stokely Patent 1,799,654 granted April 7, 1931 for a description of the operation of a 200-point step-by-step line finder such as LF1 and a regular line circuit such as LC2. The line finder LF1 is represented by a single set of brushes, two sets of terminals and two relays 50 and 53, which relays correspond to the similarly identified relays in the aforementioned Stokely patent. Each of the selector and connector switches S1 and C1 is represented by its brushes and a single set of terminals. The subgroup and group relays associated with a regular line finder group are represented by two subgroup relays 47 and 48 and an overflow relay 40.

The multiple wiring interconnecting the subgroups of terminals in the banks of the regular finders of a group is similar to that shown in the patent to G. R. Eaton 1,587,515 granted June 8, 1926, so that the lines in each subgroup are connected to the first level of the bank of one or more of the regular line finders in a group. Each auxiliary line finder is connected to the first set of terminals in one of the bank levels of a group of regular line finders and each auxiliary line finder in succession in a group is connected to the banks of a different group of regular line finders, so that calls from the subscriber lines served by auxiliary line finders will be distributed to all of the selectors associated with regular line finders. Figs. 3 and 4 illustrate this method of connecting lines to the banks of auxiliary line finders and connecting auxiliary line finders to the banks of regular line finders. Fig. 4 represents three groups of regular line finders G1, G2 and G3, each group comprising a plurality of 200-point step-by-step line finders each individually associated with a selector. The terminal banks of all finders in each regular finder group are connected in multiple in accordance with the multiple slip method disclosed in the aforementioned patent to G. R. Eaton. A single bank is shown for each of the three groups, this bank being represented by the first, second, third and last terminal in each level. There are four groups of auxiliary finders represented, each group consisting of seven rotary switches each having access in common to a group of subscriber lines. Each group of seven auxiliary finders is represented by the first, three or four and last finders in the group. The first auxiliary finder in auxiliary group 1 is connected to a line circuit identified as G1—11 and to the first set of terminals in the first level of the banks of the regular line finders in group G1; the second auxiliary finder in auxiliary group 1 is connected to a line circuit identified as G2—11 and to the first set of terminals in the first level of the banks of the regular line finders in group G2; the third auxiliary finder in auxiliary group 1 is connected to a line circuit identified as G3—11 and to the first set of terminals in the first level of the banks of the regular line finders in group G3; the fourth auxiliary finder in auxiliary group 1 is connected to a line circuit identified as G1—21 and to the first set of terminals in the second level of the banks of the regular line finders in group G1; the fifth and sixth auxiliary finders (not shown) in auxiliary group 1 are connected in like manner to the first set of terminals in level 2 of the regular line finders in groups G2 and G3; and the seventh auxiliary line finder in auxiliary group 1 is connected to the line circuit identified as G1—31 and to the first set of terminals in the third level of the banks of the regular line finders in group G1. The auxiliary line finders in each of auxiliary groups 2, 3 and 4 are connected in like manner to terminals in the banks of the three groups of regular line finders. Fig. 4 is a chart identifying the line circuit and terminal set in the regular finder banks to which each auxiliary finder in each of the four auxiliary groups is connected. A similar method of connection may be followed for any particular number of groups of auxiliary line finders and regular line finders and with any particular number of groups of regular line finders.

The operations of the line circuit LC1, auxiliary line finder circuit AF1 and auxiliary line circuit AL1 on a call initiated at subscriber station S1 will be described in detail. When the receiver is removed from the receiver hook at station S1, a circuit is closed over line L1 for operatively energizing both windings of line relay 11 in series. The operation of relay 11 connects the winding of cut-off relay 12 to sleeve conductor 19, and connects ground to the conductor 13, this conductor being common to all of the lines connected to the banks of auxiliary line finders in the same group. The connection of ground to conductor 13 completes a start circuit thereover through a normally closed contact of the test jack 14, conductor 16, a back contact of relay 34 and the winding of start relay 31 of the auxiliary line finder circuit AF1. Relay 31, operated by the current in this circuit, connects ground through resistor 30 to the ring conductor 42 to start a regular finder as hereinafter described; connects the grounded start conductor 16 to the alarm conductor 28; connects the winding of relay 33 to the sleeve conductor brushes B25 and B26 of switch 20; and connects ground through back contacts of relays 33 and 36 and the interrupter contact of stepping magnet 27 to the winding of stepping magnet 27. If, at that time, the brushes of switch 20 were standing in position 1 with brushes B21, B23 and B25 in engagement with the terminals to which the conductors 17, 18 and 19 of line L1 and line circuit LC1 are connected, an operating circuit for relay 33 is completed through brush B25, conductor 19, the upper front contact of relay 11 and the winding of relay 12, and in this case relay 33 operates before the stepping magnet 27 is operatively energized, thereby preventing the operation of stepping magnet 27. The winding of the cut-off relay 12 is operatively energized in series with the winding of relay 33; and the operation of relay 12 disconnects the windings of line relay 11 from the conductors of line 61. Relay 11 is slow in releasing so as to maintain the operating circuit for relays 31 and 12 until a holding ground potential is connected to conductor 19, as hereinafter described, to lock relay 12 operated independent of relay 11. If the line finder switch is not standing with its brushes in engagement with the terminals of a calling line at the time that relay 31 operates, relay 33 remains normal and stepping magnet 27 is alternately operatively energized and released under the control of its interrupter contacts to advance the brushes step-by-step from one position to the next until the brushes do engage the terminals of the calling line, whereupon relays 33 and 12 are operatively energized in series. The operation of relay 33 opens the operating circuit of the stepping magnet 27 and closes a circuit for operating relay 36. Relay 36 locks under control of relay 31; extends the connection from the calling line, through conductors 17 and 18 of line circuit LC1, brushes B21 and B23, and front contacts of relay 36 to conductors 41 and 42 of line circuit AL1; and closes a circuit for operatively energizing the upper winding of relay 34.

The above-mentioned connection of ground through resistor 30 to conductor 42, causes the operative energization of the lower winding of line relay 44 of line circuit AL1. The operation of relay 44 connects holding ground potential to conductor 43 to operate relay 32 of line finder circuit AF1, closes a circuit for operating the subgroup relay 47, and connects the winding of cut-off relay 45 to the sleeve conductor 46. The operation of relay 47 closes a start circuit, from ground through conductor 49 and a back contact of relay 53 of line finder LF1, for operating the start relay 50 of this line finder, which is assumed to be the first idle line finder in the group of regular line finders having access to the line AL1. The operation of relay 50 causes the brushes of line finder LF1 to be stepped up to the level including the terminals to which conductors 41, 42 and 46 are connected and then to rotate one step in this level to engage this set of terminals and extend the connection therefrom to the line relay (not shown) of the associated selector S1. The cut-off relay 45 of line circuit AL1 is thereupon operated to cause the release of relays 44 and 47, and relay 53 of the line finder circuit is operated to extend the start circuit conductor 49 to the next regular line finder in the same group, all as described in detail in the aforementioned Stokely patent. The operation of the line relay of selector S1 causes the connection of a holding ground to conductor 46 to lock cut-off relay 45 operated independent of relay 44; and, when relay 44 releases, this ground is extended from conductor 46 through a front contact of relay 45 and a back contact of relay 44 to conductor 43 to hold relay 32 of the auxiliary line finder circuit AF1 operated. The release of relay 44 causes the release of relay 47 unless there is at that time another calling line in the same subgroup.

Returning now to the operation of the auxiliary line finder circuit AF1, the operation of relay 34 closes a locking circuit for its upper winding which includes a back contact of allotter relay 37 and a back contact of test jack 14; extends holding ground from the front contact of relay 32 through front contacts of relays 36 and 34 and brush B25 to conductor 19 to hold cut-off relay 12 operated; and opens the connection between ground at a back contact of test jack 14 and the winding of allotter relay 38. The aforementioned release of line relay 11 disconnects ground from conductor 13 but relay 11 continues to be connected to ground if some other subscriber in the same group is at that time originating a call. In any event, the operation of relay 34 disconnects the winding of start relay 31 from conductor 16 so that relay 31 releases, relays 36 and 12 being thereafter held operated under the sole control of relay 32. With relay 34 operated and relay 31 released, the start circuit conductor 16 is extended through a back contact of relay 31 and a front contact of relay 34 and a normally closed contact of test jack 14 to start conductor 15 of the next auxiliary line finder in the group; so that the next call from a subscriber line in the same group will start the next idle auxiliary line finder in the group.

With the brushes of finder AF1 in engagement with the terminals of line L1 and relay 36 operated and with the brushes of line finder LF1 in engagement with the terminals of line AL1, the calling subscriber will receive dial tone from the first selector S1; and by dialing the digits of the called number the connection will be extended through the brushes of the selector S1, intermediate selectors if any, and through the brushes of a connector C1 to a called line L3 and subscriber station S3. Holding ground is supplied fom the connector C1 in usual and well-known manner to the sleeve conductors of selector S1 and line finder LF1 to maintain these switches in operated position and therefrom to conductor 46 to hold relays 45 and 32; and relay 32 holds relays 36, 34 and 12. When the calling subscriber replaces the receiver on the receiver hook, the holding ground in the connector C1 is removed from the sleeve conductors of selector S1 and line finder LF1, causing the return to normal of the line finder LF1, selector S1 and connector C1; and the disconnection of ground from conductor 46 causes the release of relays 45, 32, 36 and 12. When relay 36 releases, switch 20 remains in the same position, relay 34 is held operated under control of allotter relay 37, and the auxiliary finder AF1 cannot be again started responsive to a call until relay 34 releases.

Whenever relay 34 of finder AF1 and the corresponding relay of each of the other auxiliary line finders in the same group are all operated, allotter relay 38 releases, thereby causing the operation of relay 37; and the operation of relay 37 causes the release of relay 34 of finder AF1 and the release of the corresponding relay in each of the other auxiliary finders in the group which at that time is being held operated under the control of relay 37 alone. When relay 34 releases, the start conductor 16 is again connected to the winding of start relay 31, awaiting a call over some line in the group.

In order to reduce current drain during periods of light traffic when there is little advantage in allotting the auxiliary finders in succession, relay 37 is operated for a short interval of time under control of timing interrupter 39, thereby releasing all relays 34 in the group at predetermined intervals, for instance, at twenty minute intervals.

In case the start relay 31 of any auxiliary line finder in a group is operated and, due to some trouble condition, fails to release within a predetermined interval of time, the ground connected to conductor 28 causes the operation of alarm device 29.

If at any time all of the regular line finders in a group are busy, operation of all of the auxiliary finders which are accessible to this group of regular finders is prevented by operation of the overflow relay 40 associated with this group of regular finders. The operation of relay 40 connects ground to conductor 35, thus operating or holding operated relay 34 of finder AF1 and the corresponding relay of each auxiliary finder in all the auxiliary line finder groups which is connected to terminals in the banks of the busy group of regular line finders. When some regular finder in the group becomes idle, overflow relay 40 releases, thereby releasing the relay 34 of finder AF1 and the like relay of the other auxiliary finders if not otherwise held operated in an established connection.

From the foregoing description it is apparent each auxiliary finder cannot be again used on a second call until all of the other finders in the group have been used or are in use on a connection. However, it is desirable that a particular finder may be used repeatedly when being tested, and for this reason the locking circuit for the upper winding of relay 34 may be opened by insertion of a plug in test jack 14; and at the same time the group conductor 13 is extended through the jack to the start conductor 15 of the next auxiliary line finder in the group.

What is claimed is:

1. In an automatic telephone system comprising a plurality of groups of lines and regular line finders and selectors, each group including a plurality of line finders each of which is individual to one of the selectors and each of which has direct access to the same lines, other groups of lines and auxiliary line finders, each auxiliary line finder connected to a set of line terminals in the banks of a group of said regular line finders, the auxiliary line finders of each group being individually connected to sets of terminals in the banks of the different groups of regular finders in succession whereby all of said selectors are common to all of said other groups of lines.

2. In an automatic telephone system comprising a plurality of groups of lines and line finders and selectors, each group including a plurality of line finders each of which is individual to one of the selectors, another group of lines and auxiliary line finders, each of said auxiliary line finders connected to a set of line terminals in the banks of a different group of said first-mentioned line finders, whereby all of said selectors are common to all of said groups of lines, means including means individual to each auxiliary line finder and a chain start circuit for said group of auxiliary finders for starting the operation of an idle line finder to connect with a calling line in the group, relay means for each auxiliary finder for extending said start circuit to the next line finder in the group when a finder connects with a calling line, means for each auxiliary finder for holding its said relay means operated while the finder is connected to a calling line, and means for each of said auxiliary finders for holding said relay means operated until each of the other auxiliary finders in the group has been operated to connect with a calling line.

3. In an automatic telephone system comprising a plurality of groups of lines and line finders and selectors, each group including a plurality of line finders each of which is individual to one of the selectors, another group of lines and auxiliary line finders, each of said auxiliary line finders connected to a set of line terminals in the banks of a different group of said first-mentioned line finders, whereby all of said selectors are common to all of said groups of lines, means including means individual to each auxiliary line finder and a chain start circuit for said group of auxiliary finders for starting the operation of an idle line finder to connect with a calling line in the group, relay means for each auxiliary finder for extending said start circuit to the next line finder in the group when a finder connects with a calling line, means for each auxiliary finder for holding its said relay means operated while the finder is connected to a calling line, means for each of said auxiliary finders for holding said relay means operated until each of the other auxiliary finders in the group has been operated to connect with a calling line, and means effective when all of the auxiliary finders in a group have been operated to connect with a calling line for releasing said relay means of each finder in the group which is not then connected to a calling line.

4. In an automatic telephone system comprising a plurality of groups of lines and line finders and selectors, each group including a plurality of line finders each of which is individual to one of the selectors, another group of lines and auxiliary line finders, each of said auxiliary line finders connected to a set of line terminals in the banks of a different group of said first-mentioned line finders, whereby all of said selectors are common to all of said groups of lines, means including means individual to each auxiliary line finder and a chain start circuit for said group of auxiliary finders for starting the operation of an idle line finder to connect with a calling line in the group, relay means for each auxiliary finder for extending said start circuit to the next line finder in the group when a finder connects with a calling line, means for each auxiliary finder for holding its said relay means operated while the finder is connected to a calling line, means for each of said auxiliary finders for holding said relay means operated until each of the other auxiliary finders in the group has been operated to connect with a calling line, and means cyclically effective at predetermined intervals for releasing said relay means for each auxiliary finder in the group which is not then connected to a calling line.

5. In an automatic telephone system comprising a plurality of groups of lines and regular line finders and selectors, each group including a plurality of line finders each of which is individual to one of the selectors, other groups of lines and auxiliary line finders, each auxiliary line finder connected to a set of line terminals in the banks of a group of said regular line finders, the auxiliary line finders of each group being individually connected to sets of terminals in the banks of the different groups of regular finders in succession whereby all of said selectors are common to all of said groups of lines, means including means individual to each auxiliary line finder and a chain start circuit for said group of auxiliary finders for starting the operation of an idle line finder to connect with a calling line in the group, relay means for each auxiliary finder for extending said start circuit to the next line finder in the group when a finder connects with a calling line, means for each auxiliary finder for holding its said relay means operated while the finder is connected to a calling line, means for each of said auxiliary finders for holding said relay means operated until each of the other auxiliary finders in the group has been operated to connect with a calling line, circuit means for each of said auxiliary line finders for holding its said relay means operated until each of the other auxiliary finders in the same group has been operated to connect with a calling line.

6. In an automatic telephone system comprising a plurality of groups of lines and regular line finders and selectors, each group including a plurality of line finders each of which is indidividual to one of the selectors, other groups of lines and auxiliary line finders, each auxiliary line finder connected to a set of line terminals in the banks of a group of said regular line finders, the auxiliary line finders of each group being individually connected to sets of terminals in the banks of the different groups of regular finders in succession whereby all of said selectors are common to all of said groups of lines, means including means individual to each auxiliary line finder and a chain start circuit for said group of auxiliary finders for starting the operation of an idle line finder to connect with a calling line in the group, relay means for each auxiliary finder for extending said start circuit to the next line finder in the group when a finder connects with a calling line, means for each auxiliary finder for holding its said relay means operated while the finder is connected to a calling line, means for each of said auxiliary finders for holding said relay means operated until each of the other auxiliary finders in the group has been operated to connect with a calling line, circuit means for each of said auxiliary line finders for holding its said relay means operated until each of the other auxiliary finders in the same group has been operated to connect with a calling line, and means effective when all of the auxiliary finders in a group have been operated to connect with a calling line for releasing said relay means of each finder in the group which is not then connected to a calling line.

7. In an automatic telephone system comprising a plurality of groups of lines and regular line finders and selectors, each group including a plurality of line finders each of which is individual to one of the selectors, other groups of lines and auxiliary line finders, each auxiliary line finder connected to a set of line terminals in the banks of the group of said regular line finders, the auxiliary line finders of each group being individually connected to sets of terminals in the banks of the different groups of regular finders in succession whereby all of said selectors are common to all of said groups of lines, means including means individual to each auxiliary line finder and a chain start circuit for said group of auxiliary finders for starting the operation of an idle line finder to connect with a calling line in the group, relay means for each auxiliary finder for extending said start circuit to the next line finder in the group when a finder connects with a calling line, means for each auxiliary finder for holding its said relay means operated while the finder is connected to a calling line, means for each of said auxiliary finders for holding said relay means operated until each of the other auxiliary finders in the group has been operated to connect with a calling line, circuit means for each of said auxiliary line finders for holding its said relay means operated until each of the other auxiliary finders in the same group has been operated to connect with a calling line, and means cyclically effective at predetermined intervals for releasing said relay means for each auxiliary finder in the group which is not then connected to a calling line.

8. In an automatic telephone system comprising a plurality of groups of lines and regular line finders and selectors, each group including a plurality of line finders each of which is individual to one of the selectors, other groups of lines and auxiliary line finders, each auxiliary line finder connected to a set of line terminals in the banks of a group of said regular line finders, the auxiliary line finders of each group being individually connected to sets of terminals in the banks of the different groups of regular finders in succession whereby all of said selectors are common to all of said groups of lines, group means including means individual to each auxiliary line finder and a chain start circuit for each group for starting the operation of an idle auxiliary line finder to connect with a calling line in the group, relay means for each auxiliary line finder for extending the group start circuit to the next auxiliary line finder in the group when an auxiliary line finder connects with a calling line, means for each auxiliary line finder for holding its said relay means operated while the finder is connected to a calling line, group means including means individual to each regular line finder and a chain start circuit for each regular line finder group for starting the operation of an idle regular line finder to connect with a calling line or with an auxiliary line finder which is operated to connect with a calling line, relay means for each regular line finder for extending the group start circuit to the next regular line finder in the group when a regular line finder connects with a calling line, means for each regular line finder for holding its said relay means operated while the finder is connected to a calling line, and means effective when all of the regular line finders in a group are busy for operating said relay means associated with each idle auxiliary line finder connected to the banks of the regular line finders of said busy regular line finder group.

OLIVER C. HALL.

REFERENCES CITED

The following references are of record in the file of this patent:

UNITED STATES PATENTS

| Number | Name | Date |
|---|---|---|
| 1,507,966 | Irvine | Sept. 9, 1924 |
| 1,740,559 | Aitken | Dec. 24, 1929 |
| 1,914,540 | Taylor | June 20, 1933 |
| 1,984,060 | Deakin | Dec. 11, 1934 |